United States Patent [19]

Hortman et al.

[11] 4,293,598

[45] Oct. 6, 1981

[54] METHOD FOR INCREASING BORON[10] CONTENTS OF NEUTRON ABSORBING ARTICLES

[75] Inventors: Michael T. Hortman, Tonawanda; Robert G. Naum, Lewiston, both of N.Y.

[73] Assignee: The Carborundum Company, Niagara Falls, N.Y.

[21] Appl. No.: 960,150

[22] Filed: Nov. 13, 1978

[51] Int. Cl.$^3$ .............................................. G21F 1/10
[52] U.S. Cl. ................................. 427/203; 250/517; 250/519; 250/515; 252/478; 428/524; 376/905
[58] Field of Search ................ 252/478; 250/518, 517, 250/519; 176/93 R, DIG. 2; 427/203, 202, DIG. 10; 428/524

[56] References Cited

U.S. PATENT DOCUMENTS

| | | | |
|---|---|---|---|
| 1,009,682 | 12/1926 | Angebaud | 250/518 |
| 2,796,411 | 6/1957 | Zirkle et al. | 250/518 |
| 2,796,529 | 6/1957 | Morrison | 250/518 |
| 2,858,451 | 10/1958 | Silversher | 250/518 |
| 2,928,948 | 3/1960 | Silversher | 250/518 |
| 2,983,821 | 5/1961 | Cap | 250/518 |
| 2,991,368 | 7/1961 | Reissner | 250/518 |
| 3,016,463 | 1/1962 | Needham | 250/518 |
| 3,061,491 | 10/1962 | Sherrard et al. | |
| 3,106,535 | 10/1963 | Blanco | 252/478 |
| 3,230,375 | 1/1966 | Wagoner et al. | 250/518 |
| 4,027,377 | 6/1977 | Roszler | 250/517 |
| 4,035,961 | 7/1977 | Pemrick et al. | 51/295 |
| 4,042,559 | 8/1977 | Abelson et al. | 260/38 |

FOREIGN PATENT DOCUMENTS

| | | | |
|---|---|---|---|
| 2037514 | 2/1972 | Fed. Rep. of Germany | 250/517 |
| 2263676 | 7/1973 | Fed. Rep. of Germany | 250/517 |
| 1176997 | 4/1959 | France | |
| 72917 | 5/1976 | Luxembourg | |

Primary Examiner—Deborah L. Kyle
Attorney, Agent, or Firm—Raymond F. Kramer; Robert C. Weber

[57] ABSTRACT

A method for increasing the boron[10] content of a neutron absorbing article, such as one in flat, flexible sheet shape, includes coating a surface of such article with a solidifiable liquid synthetic organic polymeric material, such as a phenol formaldehyde type resin, applying boron carbide particles to the polymeric material and solidifying the polymer, such as by curing to cross-linked permanently set form, so as to hold the neutron absorbing boron carbide particles in place thereon. In highly preferred embodiments of the invention the boron carbide particles applied will extend beyond the surface of the external material and will serve as anchoring means for applications of subsequent coatings and the plurality of coatings, usually after initial partial curing to solidify them and make them form-retaining, will be permanently cross-linked simultaneously. In another aspect of the invention the plurality of flat neutron absorbing articles may be joined together by contacting surfaces thereof with such a coating material, preferably containing boron carbide particles, and curing it.

9 Claims, 9 Drawing Figures

METHOD FOR INCREASING BORON[10] CONTENTS OF NEUTRON ABSORBING ARTICLES

This invention relates to increasing the neutron absorbing capability of neutron absorbing articles. More particularly, it relates to a method for increasing the boron[10] content of previously completed neutron absorbing articles by application of a solidifiable coating and boron carbide particles to such articles, followed by solidification of the coating to hold the boron carbide in place thereon.

The use of various neutron absorbing materials for absorbing undesirable radiation from nuclear materials is well known. It has long been recognized that boron[10] hereafter referred to as $B^{10}$, is an effective neutron absorber. However, $B^{10}$, which is present with $B^{11}$ in the normal isotopic mixture of boron, is normally not readily separable from $B^{11}$ and boron and its compounds do not usually possess the physical characteristics needed for uses alone as neutron absorbers. Accordingly, it has been suggested that boron compounds, such as boron carbide, which includes the normal isotopic mixture of $B^{10}$ and $B^{11}$, be dispersed in particulate form in various polymeric media and that the articles made be interposed between nuclear radiation sources and areas and personnel to be protected from such sources. Thus, storage racks for spent nuclear fuel have been made wherein plates or sheets of phenol formaldehyde type polymers containing boron carbide particles bound therein have been fitted into cavities or slots about such stored spent fuel so that they would be in the paths of any neutrons being emitted from the fuel and would absorb such neutrons.

Neutron absorbing articles are known in which boron carbide particles (or the $B^{10}$ content thereof) are the primary active neutron absorbing materials. U.S. Pat. Nos. 2,942,116 and 3,133,887 describe boron carbide and other boron compounds in polymeric matrices for the manufacture of products which are useful as neutron absorbers. U.S. Pat. Nos. 4,225,467, issued Sept. 30, 1980 to McMurtry, Naum, Owens and Hortman for Neutron Absorbing Article and Method for Manufacture of Such Article, 4,198,322, issued Apr. 15, 1980 to Roger S. Storm for One-Step Curing Method for Manufacture of Neutron Absorbing Plates, 4,156,147, issued May 22, 1979 to Naum, Owens and Dooher for Neutron Absorbing Article, and 4,213,883, issued July 22, 1980 to Dean P. Owens for Method for Manufacture of Neutron Absorbing articles, all relate to neutron absorbing articles, specifically plates, wherein boron carbide particles are dispersed in a phenolic polymer matrix. U.S. Pat. No. 4,218,622, issued Aug. 19, 1980 to McMurtry, Naum and Forsyth for Neutron Absorbing Article and Method for Manufacture Thereof, relates to a neutron absorbing article which is in sheet form, normally flat, thin, flexible and of comparatively light weight, with a backing member, such as woven fiberglass cloth, coated with a synthetic organic polymeric coating, such as a cured phenolic resin, and with boron carbide particles held to the backing member by the cured coating. Such applications are hereby incorporated by reference for their disclosures of boron carbide particles and characteristics thereof, phenolic resins and polymers, other materials, methods and uses and other disclosures therein. Additionally, U.S. Pat. Nos. 1,609,682; 2,796,411; 2,796,529; 2,858,451; 2,928,948; 2,991,368; 3,016,463; and 3,061,491 all relate to sheets or laminates including neutron absorbing materials such as boron compounds, e.g., boron carbide, in polymeric matrices. However, none of such patents describes the highly preferred products and processes of this invention and none is for products and processes possessing the distinct advantages of those described in this application. Thus, U.S. Pat. No. 1,609,682 describes X-ray absorbing devices which include a plurality of central cloth sheets cemented together, wit radiation absorbing salts in openings in the cloths, and with covering veneers on the major surfaces thereof. U.S. Pat. No. 2,796,411 is for a methyl methacrylate shield containing boron carbide. U.S. Pat. No. 2,796,529 describes a radiation shield in which a boron or calcium borofluoride powder is mixed with synthetic resin and it is mentioned therein that sheets of the resin mix may be laminated with other materials. U.S. Pat. No. 2,858,451 relates to a laminated ray shielding material comprising three sheets, one of which is a heavy metal, another of which is a metallic reflector and the third of which is a resin bonding the first two together. U.S. Pat. No. 2,928,948 is also for a laminate which may include metals and fibrous materials, among which glass fabric or fibers are mentioned, and it is recited that boron compounds may be utilized. However, in such products a layer of boron in a binder is held to a lead sheet by a resin layer. U.S. Pat. No. 2,991,368 also describes laminates wherei resin impregnated paper film is used to bond a layer of boric oxide and a thin layer of phenolic resin. In such case the powdered loading material, e.g., boric oxide, is poured over an adhesive surface which readily captures it as a single layer. U.S. Pat. No. 3,016,463 is for a vessel having a neutron absorbing layer in the wall thereof, which layer may be composed of boron carbide powder. Finally, U.S. Pat. No. 3,061,491 teaches impregnation of a fabric substrate with a prime plastisol coat which may be laminated. The plastisol coat may include neutron absorbing materials such as heavy metals, e.g., lead. None of such patents describes the present invention, which is considered to be most relevant to the subject matter of U.S. Pat. No. 4,218,622, and which provides a method for increasing the boron carbide content of the products of such invention. It has been known to repair boron carbide-polymer plates that have holes or cavities therein with a mixture of resin and boron carbide which is troweled into the cavity and smoothed, after which the resin is cured. However, such repair operation is different from the present coating to increase neutron absorbing properties.

When neutron absorbing sheets, such as those of U.S. Pat. No. 4,218,622 are manufactured they are usually of comparatively low neutron absorbing capabilities because of the relatively thin sheet form, the volume thereof taken up by the backing member, such as a fiberglass cloth, and the thinness of the curable liquid polymeric coating (if too much is applied there is the danger of having it run off the backing member). To obtain an increased neutron absorbing capability in spent fuel storage racks several neutron absorbing sheets may be used together but this may introduce problems in fitting the sheets into the racks in some cases because of tendencies for them to fill some slots irregularly when a plurality is being used and additionally, relative movements between the sheets during installation and possible vibrational movements thereafter may result in loosening of surface deposits of neutron absorbing material and "sifting" of such to the bottoms of the storage rack slots, with diminutions of neutron absorbing capabilities of the sheets in the upper portions of the racks. In addition to such difficulties which can be encountered in employing a plurality of thin sheets together, there may be a prejudice on the part of some nuclear engineers against utilizing separate sheets and in favor of employing only integral absorbers, which are normally expected to be physically stronger. Thus, specifications for neutron absorbing capabilities of single sheets or plates may exceed those normally readily obtainable by the method of U.S. Pat. No. 4,218,662. The present invention supplies a means for increasing the neutron absorbing capabilities of thin sheet neutron absorbers and of avoiding the difficulties of employing together a plurality of separate neutron absorbing sheets which are each of lower neutron absorbing powers. Additionally, excellent physical characteristics are obtained in the final product, in addition to increased neutron absorbing power, and a unitary upgraded product results which is of good strength and which is readily manufactured. The invention also allows the stockpiling of large quantities of the basic sheet materials which can then be easily converted to uniformly absorbing products of desired and diverse neutron absorbing capabilities to suit the specifications of various customers for their different applications.

In accordance with the present invention a method for increasing the $B^{10}$ content of a neutron absorbing article comprises coating a surface of such article with a liquid synthetic organic polymeric material, applying boron carbide particles to the polymeric material and solidifying the polymer to hold the boron carbide particles in place on the article. More particularly, the invention is of a method for increasing the $B^{10}$ content of a neutron absorbing article which includes neutron absorbing boron carbide particles in a matrix of cured solid polymeric material which comprises coating a surface of such article with a curable liquid synthetic organic polymeric material, applying boron carbide particles to the curable polymeric material so that portions of such particles project beyond the surface of the curable polymeric material, and curing and solidifying the polymer to solid form so that it holds the boron carbide particles in place on the neutron absorbing article, with portions of said particles projecting beyond the surface of the cured polymeric material. The invention also relates to methods for plural coating neutron absorbing articles in sheet form and to joining such articles together, as well as to the products of such processes.

The invention will be readily understood from the specification and the drawing, considered in conjunction therewith, in which.

Figure 1:
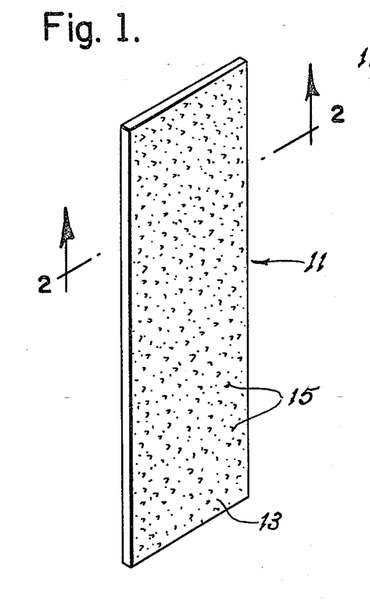
FIG. 1 is a perspective view of a flat neutron absorbing sheet suitable for treatment by the method of this invention (it also resembles, except for an increased thickness, a sheet product of the present invention)
Figure 2:
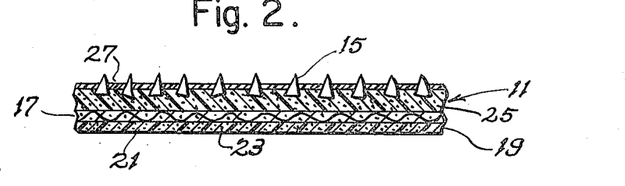
FIG. 2 is an enlarged partial sectional view along plane 2—2 of FIG. 1.

In FIG. 1 neutron absorbing article 11 is shown as a thin rectangular sheet containing on the surface facing the viewer a polymeric matrix material 13 (which includes finely divided boron carbide particles with it but may sometimes contain no such particles) with relatively coarse boron carbide particles 15 projecting from it. Although article 11 will normally be quite thin and may be flexible in at least one dimension (sometimes depending upon the weave of the cloth base employed) and the corresponding article of increased $B^{10}$ content may also be flexible, it is possible to increase the $B^{10}$ content of an inflexible article and one may make the increased sheet of increased $B^{10}$ content thick enough so that its flexibility is substantially diminished, which is sometimes desirable. In FIG. 2 neutron absorbing article 11, shown in enlarged cross-section, with the coarse boron carbide particles being of exaggerated size and of a lesser concentration than actual (for purpose of illustration), includes a fiberglass or other suitable cloth backing material or member 17, a backing coat 19 of a mixture of cured polymer 21 and embedded finely divided boron carbon particles 23, a make coat 25 of resin and boron carbide particles and coarse particles 15 embedded or rolled therein. A polymer coating 27 is shown further anchoring the particles in place. Although not specifically illustrated, portions of such coating tend to cover some of the projecting parts of coarse particles 15. Also not specifically illustrated are a preferred initial coating of the fiberglass or other cloth backing member with a material for enhancing adhesion of polymeric material to the cloth filaments, such as an aminosilane (when fiberglass filaments are employed), and a preferred initial coating of the cloth with polymeric resin, e.g., phenolic resin.

Figures 3, 6, 7, 8, 9:
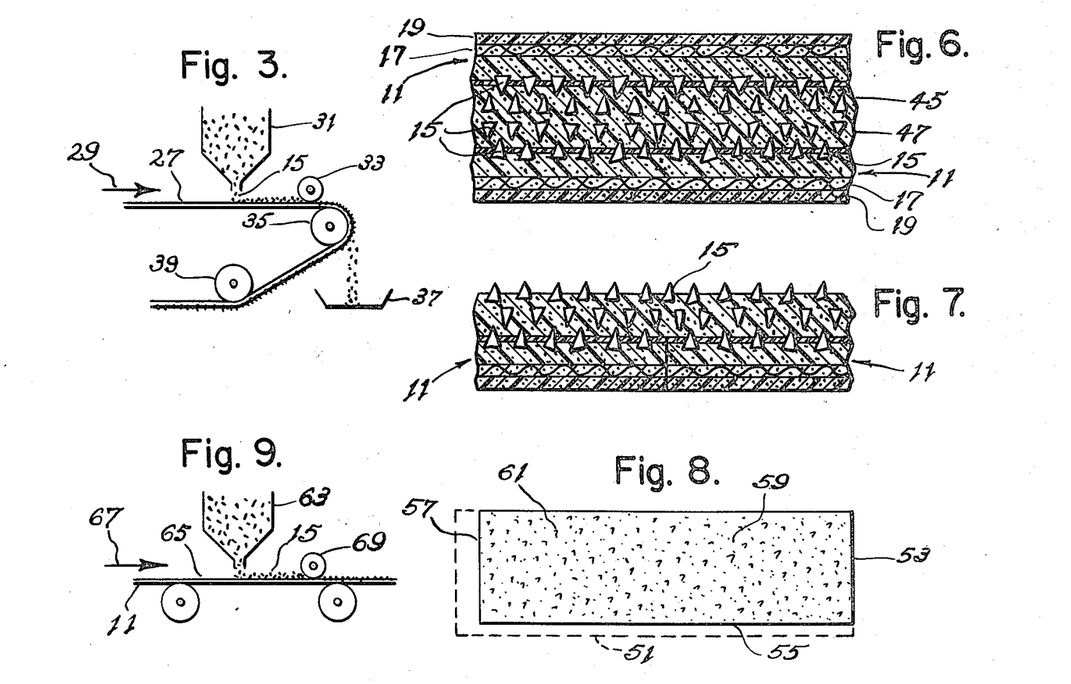
FIG. 3 is a schematic illustration of the application of boron carbide particles to the surface of a web previously coated with liquid resin, as employed to make the article of FIG. 2 (such illustration is also suitable to represent schematically a method by which products of the present invention may be made)
FIG. 6 is an enlarged cross-sectional view of two neutron absorbers like that illustrated in FIG. 2 joined together face to face by a cross-linked resin containing boron carbide particles.
FIG. 7 is an enlarged cross-sectional view of two neutron absorbing sheets like that of FIG. 2 joined together end to end by a coating on a surface thereof of cross-linked polymer containing boron carbide particles.
FIG. 8 is a view of a major surface of a neutron absorber like that of FIG. 2, increased in neutron absorbing capability by application of a coating of a cross-linked polymer containing boron carbide particles, which coating is applied to such major surface of the neutron absorbing sheet (the phantom lines indicate the original size of the neutron absorber before cutting to desired new size and coating)
FIG. 9 is a schematic view of application of boron carbide particles to a major surface of a neutron absorbing sheet pre-coated with liquid polymer.

In FIG. 3 is shown diagrammatically the making of a neutron absorbing article (which may be increased in $B^{10}$ content by the method of this invention). A continuous belt 27 of a backing member material, such as fiberglass cloth, coated with uncured liquid resin-boron carbide mix, moves in the direction of arrow 29 beneath distributor 31, from which relatively coarse boron carbide particles 15 drop onto it in a regular stream. The belt, sheet or web passes under roller 33 which presses the coarser particles into the resin-particles mix, without the roller contacting the resin, and then travels over roller 35 so that boron carbide particles 15, not held to the web by resin, fall off it into collecting bin or trough 37. The backing member, coated with cured or partially cured boron carbide-polymer mix on one side thereof (the roll side) and with uncured boron carbide-polymer mix with coarser boron carbide particles adhering thereto on the other side, passes under roll 39 and is taken off for further treatment, such as partial curing, coating, partial curing, final curing, etc. This process is also applicable for further coating such finished article to increase its $B^{10}$ content. More details about the structure and manufacture of the neutron absorbing article being increased in $B^{10}$ content may be found in U.S. Pat. No. 4,218,622, previously mentioned.

Figure 4:
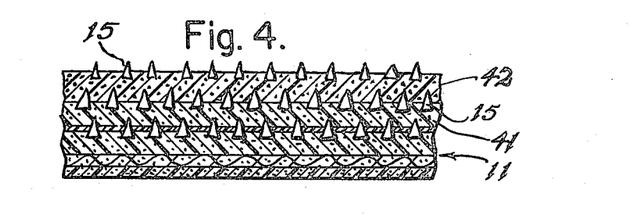
FIG. 4 is an enlarged sectional view corresponding to FIG. 2, showing the article thereof with coatings of cured resin and boron carbide particles on a major upper surface thereof.
Figure 5:
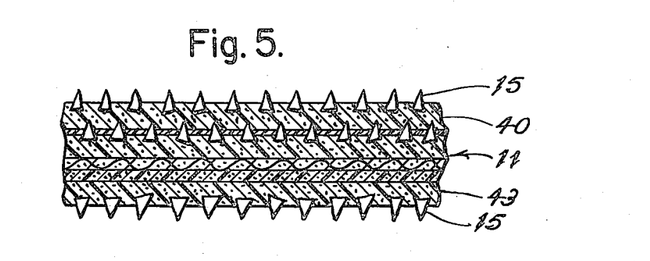
FIG. 5 is an enlarged cross-sectional view like that of FIGS. 2 and 4 with one coating of resin and boron carbide particles on one surface of the neutron absorber and another coating thereof on an opposing surface.

FIG. 4 shows the neutron absorbing article of FIG. 2 coated with mixtures 41 and 42 of polymerized resin and fine or mixed fine-coarse boron carbide particles, with coarser boron carbide particles 15 partially embedded therein and held at the new article surfaces. As will be apparent, one may coat the article with layer 41 only, with particles 15 pressed therein. If two or more coatings are employed, as shown, they may be of different thicknesses, $B^{10}$ contents and boron carbide sizes, as desired, but even distribution of the boron carbide is usually of importance. FIG. 5 details another step in adding $B^{10}$ absorbing power to the neutron absorbing article, this time by applications of mixtures 40 and 43 of resin and boron carbide particles and the embedding therein of additional coarser boron carbide particles 15.

In FIG. 6 is seen the employment of two of the initial neutron absorbing articles to be increased in $B^{10}$ content, each being coated with a layer of mixed polymerizable resin and finer boron carbide particles, such layers being designated by numerals 45 and 47, with coarser boron carbide particles 15 therein, which are pressed together and cured so as to make an article of more than twice the original thickness. In FIG. 7 there is shown the joining together in a different configuration of two neutron absorbing articles 11 by application to a surface thereof (preferably that containing the protruding coarse boron carbide particles) of a mixture of boron carbide particles and polymerizable or solidifiable resin or polymer, with coarser boron carbide particles 15 protruding therefrom. In FIG. 8 phantom lines 51 show the original dimensions of a neutron absorbing article 53 that has been changed in size, as by cutting along sides 55 and 57. Such cutting can sometimes cause chipping or fraying at the cut edges, which may cause further disintergration of the article on use and with handling but application of a covering surface of resin and boron carbide particles as mixture 59, preferably with embedding of coarser boron carbide particles 61 therein, increases the neutron absorbing capability of the sheet and strengthens it so as to prevent deterioration on use (especially at the cut edges). Thus, as shown in FIGS. 4–8, various methods of this invention for increasing the $B^{10}$ content of neutron absorbing articles include thickening such article on one or both major surfaces, with one or two or more coatings of resin-boron carbide powder mix (or resin alone) and applications of coarser boron carbide particles to the surfaces thereof and additionally include different methods for joining together sheets of neutron absorbers and of converting them to desired dimensions and shapes, usually by changing the thicknesses thereof or by changing the dimensions and shapes of the major surfaces thereof.

In FIG. 9 there is schematically shown a modification of the apparatus of FIG. 3 for depositing coarse boron carbide particles onto a resin or resin-particle coating on the neutron absorbing article and rolling or pressing such particles into the surface of the article. The resin or hardenable polymer may be applied to a flexible neutron absorbing article sheet by a doctor blade, roller or other similar applicator (not shown) and apparatus like that of FIG. 3 may be utilized. However, for more rigid neutron absorbing articles the modification of FIG. 9 may be preferred. In such illustration distributor 63 uniformly feeds relatively coase boron carbide particles 15 onto the coated surface 65 of a sheet or strip of neutron absorbing article 11 (or equivalent) coated with resin or resin-particle mix, which sheet is moving in the direction of arrow 67. The coarse particles are then pressed into the surface of coating 65 by roller 69. After removal of the sheet (if non-flexible) from the apparatus, it is turned over and the non-embedded particles are removed (allowed to fall due to gravity). Alternatively, they may be blown off the surface of the article. Subsequently, as described elsewhere, the product may be cured to final permanently set solid form.

The $B_4C$ article particles, employed for their neutron absorbing capability, will normally be in rather finely divided particulate form. Thus, such particles will generally be within the No. 10 to No. 400 sieve range, U.S. Sieve Series, signifying that they will pass through a No. 10 sieve and rest on a No. 400 sieve. Usually the finer particles, utilizable in forming matrices with polymeric materials, will be of particle sizes in the No. 170 to No. 400 sieve range, preferably passing through a No. 200 sieve. The coarser boron carbide particles employed to form a heavier coating on one side of the article, may be in the No. 10 to No. 200 sieve size range, preferably being from 35 to 200, more preferably 60 to 200 and sometimes most preferably in the 60 to 120 range. For many of the coatings of this invention the particle sizes will span the finer and coarser ranges. It is important that fairly finely divided boron carbide particles be employed, as described, to produce effective bonds to the polymeric material to be cured about such particles and to obtain a uniformly distributed boron carbide content in the polymeric matrix and it is desirable that at the surfaces to be re-coated or joined together at least some of the coarser of the particles be coarse enough to project beyond the matrix.

Boron carbide often contains impurities, of which iron (including iron compounds) and $B_2O_3$ (or impurities which can readily decompose to $B_2O_3$ on heating) are among the more common. Both of such materials, especially $B_2O_3$, have been found to have deleterious effects on neutron absorbing products in certain environments and therefore contents thereof are desirably limited. For example, although as much as 3% of iron or its compounds may be tolerable in the boron carbide particles of the boron carbide absorbers, preferably the iron content is held to 2%, more preferably to 1% and most preferably is less than 0.5%. Similarly, to obtain best absorbing articles, especially when they are of long, thin flat sheet form, it is useful to limit the $B_2O_3$ content (including boric acid, etc., as $B_2O_3$), usually to no more than 2%, preferably to less than 1%, more preferably to less than 0.5% and most preferably to less than 0.2%. The lower the iron and $B_2O_3$ contents the better.

The boron carbide particles utilized will usually contain the normal isotopic ratio of $B^{10}$ but may also contain more than such proportion to make even more effective neutron absorbers. It is also possible to use boron carbide with a lower than normal percentage of $B^{10}$ (the normal percentage being about 18.3%, weight basis, of the boron present) but such products are rarely encountered and are less advantageous with respect to neutron absorbing activities.

Other than the mentioned impurities, normally boron carbide should not contain significant amounts of components other than $B_4C$ (boron and carbon in ideal combination) and minor variants of such formula unless the $B_4C$ is intentionally diminished in concentration by use of a diluent or filler material, such as silicon carbide and others, various of which are mentioned in Ser. No. 866,101 of Naum, Owens and Dooher, previously cited, or unless another radiation absorber, such as lead, is present. For good absorbing effectiveness at least 90% of the boron carbide particles should be boron carbide, preferably at least 94% and more preferably at least 97% and the $B^{10}$ content of the particles (from the boron carbide) for best absorption characteristics will be at least 12%, preferably at least 14% (14.3% $B^{10}$ is theoretically present in pure $B_4C$). To maintain the stability of the boron carbide-phenolic polymer article made, under severe operating conditions, it is often considered to be important to limit the contents of halogen, mercury, lead and sulfur and compounds thereof, such as halides, in the final product and so of course, such materials, sometimes found present in impure phenolic resins, solvents, fillers and plasticizers, will be omitted from those and will also be omitted from the composition of the boron carbide particles to the extent this is feasible. At the most, such materials will contain no more of such impurities than would result in the final product just meeting the upper limits of contents allowed, which will be mentioned in more detail in a subsequent discussion with respect to the phenolic polymer and the resins from which it is made. Although it is important and highly desirable that the boron carbide and other components employed in the making of the present articles should, for best results, contain little or no halogen, mercury, lead, sulfur and other objectionable materials, it is considered that for some applications wherein the presence of such materials is not considered to be harmful the specification limits set for contents thereof may be increased and in some instances no such limits will be imposed. Thus, in various applications, as when resistance to storage pool media, such as water and boric acid solutions, is not required, halogens, mercury, etc., may often be present without adversely affecting characteristics of the present articles.

The solid, irreversibly cured polymeric material, cured to a continuous matrix about the finer boron carbide particles and cured so as to hold the coarser boron carbide particles in place, which polymer may also be employed as a preliminary filling coating on the backing member and as an overcoat for one side of the article, is preferably made from a phenolic resin which is in liquid form at normal temperatures, e.g., room temperature, 20°–25° C., but also may be from a resin which becomes liquid at an elevated temperature at which application of the resin may be effected in the present processes. The phenolic resins constitute a class of well-known thermosetting resins. Those most useful in the practice of the present invention are condensation products of phenolic compounds and aldehydes. Of the phenolic compounds phenols and lower alkyl- and hydroxy-lower alkyl-substituted phenols are preferred. Thus, the lower alkyl-substituted phenols may be of 1 to 3 substituents on the benzene ring, usually in ortho and/or para positions and may be of 1 to 3 carbon atoms, preferably methyl, and the hydroxy-lower alkyls present will similarly be 1 to 3 in number and of 1 to 3 carbon atoms each, preferably methylol. Mixed lower alkyls and hydroxy-lower alkyls may also be employed but the total of substituent groups, not counting the phenolic hydroxyl, is preferably no more than 3. Although it is possible to make a useful product with the phenol of the phenol aldehyde type resin essentially all substituted phenol, some phenol may also be present with it, e.g., 5 to 50%. For ease of expression the terms "phenolic type resins", "phenol aldehyde type resins" and "phenol formaldehyde type resins" may be employed in this specification to denote more broadly than "phenol formaldehyde resins" the acceptable types of materials described which have properties equivalent to or similar to those of phenol formaldehyde resins and trimethylol phenol formaldehyde resins when employed to produce thermosetting polymers in conjunction with boron carbide particles (or boron carbide plus diluent particles, e.g., silicon carbide and other particles, as described herein).

Specific examples of useful "phenols" which may be employed in the practice of this invention, other than phenol, include cresol, xylenol and mesitol and the hydroxylower alkyl compounds preferred include mono-, di- and trimethylol phenols, preferably with substitution at the positions previously mentioned. Of course, ethyl and ethylol substitution instead of methyl and methylol substitution and mixed substitutions whereins the lower alkyls are both ethyl and methyl, the alkylols are both methylol and ethylol and wherein the alkyl and alkylol substituents are also mixed, are also useful. In short, with the guidance of this specification and the teaching herein that the presently preferred phenols are phenol and trimethylol phenol, other compounds, such as those previously described, may also be utilized providing that the effects obtained are similarly acceptable. This also applies to the selection of aldehydes and sources of aldehyde moieties employed but generally the only aldehyde utilized will be formaldehyde (compounds which decompose to produce formaldehyde may be substituted).

The phenolic or phenol formaldehyde type resins utilized are employed as either resols, novolaks or mixes. The former are generally called one-stage or single-stage resins and the latter, with hexamethylenetetramine or equivalent present, are two-stage resins. The major difference is that the single-stage resins include sufficient aldehyde or alkylol moieties in the partially polymerized lower molecular weight resin to completely cure the polymer to cross-linked and thermoset state upon application of sufficient heat for a sufficient curing time. The two-stage resins or novolaks plus curing agent are initially partially polymerized to a lower molecular weight resin without sufficient aldehyde or equivalent present for irreversible cross-linking so that a source of such material, such as hexamethylenetetramine, is added to them in order for a complete cure to be obtained by subsequent heating. Either type of resin or mixtures thereof may be employed to make phenolic polymers such as those described herein. When the polymerization reaction in which the resin is formed is acid catalyzed HCl will usually be avoided (to minimize chloride content in the resin) and formic acid or other suitable chlorine-free acid may be used.

Preferably the resin utilized is one which is normally liquid, even without the need for employment of solvents, although some water will often be present with it, e.g., 3 to 15% or preferably 6 to 12%. Preferably such resin will be a resol and the molecular weight of the resin will be in the range of 200 to 1,000, preferably 200 to 750 and most preferably 200 to 500. Thus, it is noted that the resin will usually be a monomer, dimer or trimer and preferably is a mixture of monomer and dimer. Generally the resin content of the liquid state resin preparation employed will be from 50 to 90%, preferably being about 55 to 85%. The solvent content, usually principally water, may be from 3 to 30% but is normally within the ranges previously given. Other components of the liquid resin include the aldehyde and phenolic compound from which it is made. Thus, for example, in a liquid unmodified phenolic resin of the single-stage type based principally on the condensation product of trimethylol phenol and formaldehyde, there may be present about 82% of dimer, about 4% of monomer, about 2% of trimethylol phenol, about 4% of formaldehyde and about 8% of water. Among the useful liquid products that may be employed are Arotap 352-W70, which is of the description previously given for the trimethylol phenol formaldehyde and is especially low in halogen content; Arotap 352-W-71; Arotap 358-W70 (also called Arofene 358-W-70), a formic acid catalyzed phenol formaldehyde resin of properties like that of Arotap 352-W-70; Arotap 8082-Me-56; Arotap 8095-W-50; Arofene 744-W-55; Arofene 986-Al-50; Arofene 536-E-56; and Arofene 72155, all maufactured by Ashland Chemical Company; PA-149, manufactured by Polymer Applications, Inc. and B-178; R3; and R3A, all manufactured by The Carborundum Company. All such resins will be modified when desirable (when contents of the following impurities are too high) to omit halides, especially chloride, halogens, mercury, lead and sulfur and compounds thereof or to reduce proportions thereof present to acceptable limits. In some cases the procedure for manufacture of the resin will be changed accordingly. Generally the viscosity of such resin at 25° C. will be in the range of 200 to 700 centipoises, preferably 200 or 250 to 500 centipoises. Usually the resin will have a comparatively high water tolerance, which will generally be from 200 to 2,000 or more percent and preferably will be at least 300%, e.g., at least 1,000%. Typical properties of a preferred resin, Arofene 358-W-70, are viscosity at 25° C. in the range of 250 to 500 centipoises, gel time of 14 to 19 minutes, solids content of 69 to 73% and pH of 7.9.

Although the phenolic resins and particularly the phenol formaldehyde type resins are highly preferred in the present applications other thermosettable resins may also be employed instead. These will not be described in the same detail as that given for the phenolic resins but the properties thereof will be similar. In some instances, it may be possible to utilize high softening point thermoplastic resins but generally this will not be preferred. Among the useful thermosetting polymers there may be mentioned the polyesters, epoxies, alkyds, diallyl phthalate, melamine and urea formaldehydes, polyurethanes and polyimides. More detailed descriptions of such materials and properties thereof may be found in the 1975–1976 Modern Plastics Encyclopedia, published by McGraw-Hill Inc., New York, New York, at pages 6–158 and 465–490 and in the Encyclopedia of Chemistry, 3rd Edition, by Hampel and Hawley, published by Van Nostrand Reinhold Company, New York, New York. In selecting other thermosetting (or thermoplastic, in certain circumstances) polymers consideration should be given to stability and strength retention upon radiation and resistance to softening or creeping at elevated temperatures within the range to which the present articles are normally exposed.

The backing member utilized in preferably a woven fiberglass cloth but it is also within this invention to employ other materials instead, providing that they have processing and product characteristics which enable them to be made into items treated by the present method and utilized in the mannwer described. Thus, instead of using fiberglass cloth, one may sometimes choose to employ fibers and cloths of synthetic organic polymeric materials, carbon, graphite, boron carbide, silicon carbide, boron nitride, ceramics, aluminum silicate, alumina, silica, quartz, zirconia, basalt, various combinations thereof, e.g., fiberglass and polyester, carbon and fiberglass, and even natural polymers, such as cellulose, cotton, linen, jute and hemp, providing that they are sufficiently strong and resistant to radiation. Also, it is within the invention to employ these materials in sheet or film form or as perforated sheets, insofar as such can be made. Furthermore, such sheet materials and cloths, including non-woven cloths and felts, may be reinforced with strengthening materials such as glass fibers, carbon fibers, silicon carbide fibers, boron carbide fibers, graphite fibers and other equivalent fibrous reinforcements. The important determining factors for successful products are flexibility, for processing and final use, and radiation resistance, so that the backing member will not deteriorate unacceptably upon exposure to radiation, e.g., $1 \times 10^{11}$ rads. The particular use to which the product is to be put is important and various materials which might not stand up under excessive radiation can be used where the expected exposure is lower. Also, even for those materials which are unstable under radiation (and this applies to both the backing member and the coating[s] thereon), in some applications, like those wherein after manufacture the article is encased in a protective enclosure (which may be vented) some decomposition may be tolerable and in some cases even significant decomposition mau not adversely affect the neutron absorbing capability of the product. For example, although polyester cloth is not the preferred backing member material because of a lowering of tensile strength when it is exposed to massive radiation, leading to lower tensile strengths in products in which such cloth is used as a backing member, it may be acceptable in various applications, including those wherein it is held firmly in place, as between sandwiching metal walls, so that the $B_4C$ particle distribution is maintained regular.

Among other plastics or polymeric materials which may be employed as backing members there may be mentioned polyethylene, polypropylene, nylons, polyesters, polyethers, polyurethanes, polyacrylates and various other suitable thermoplastic and thermosetting materials, such as those described in the Modern Plastics Encyclopedia and the Encyclopedia of Chemistry publications cited above. Additionally, in some cases cotton and various other natural textile materials may be employed, alone or in mixtures.

The backing member, whether of a film or sheet, woven or non-woven, should normally be of a thickness in the range of 0.1 to 2 mm., preferably 0.1 to 1 mm. and most preferably 0.2 to 0.3 mm. The weight of such material, preferably cloth, will normally be from 50 or 100 to 1,000 or 2,000 g./sq. m. The denier may be varied as desired and the weaves of cloths may be any such found to be suitable but preferably will be such as to result in a flexible backing. Various thread counts may be employed but preferably they are in the range of from 20 to 100 for both warp and fill, usually from 30 to 80. The cloth may be pretreated with known non-halogenated adhesion promoting chemicals to promote adherence of resin to it. For example, fiberglass is normally treated with a known aminosilane treatment which increases the adhesion of phenolic resin to the glass. Also, usually before use, any coatings on the cloth, fibers or sheet, such as starch sizes, oils, waxes, etc., will be removed.

The neutron absorbing article to be increased in $B^{10}$ content is usually of a thickness of 1 to 5 mm., preferably about 1 to 3 mm. thick and most preferably about 1 to 2 mm. The $B^{10}$ loading is usually from 0.001 to 0.04 g./sq. cm., with the higher loadings being more feasible when an additional coating of "coarse" $B_4C$ particles is laid on the "smooth" side of the present article so that coarse particles are on both sides thereof, or two (or more) of the present articles are joined together, as by resin coating and polymerization, preferably at the "smooth" sides thereof. Preferably the $B^{10}$ concentration is from 0.005 to 0.035 g./sq. cm. (for example 0.01 to 0.02 g./sq. cm.) and the weight of the sheet produced is in the range of 500 to 3,000 g./sq. m. preferably 1,000 to 2,000 g./sq. m. Preferably the boron carbide particles in the finished article are so distributed that 3 to 25%, preferably 10 to 20% of the total boron carbide and $B^{10}$ are on one side of the backing member and the balance is on the other side, said balance being divided between 10 to 35%, preferably 15 to 30% of fairly finely divided boron carbide particles (mixed in with polymer) and 40 to 80%, preferably 55 to 75% in larger particle form (adhered to said polymer layer). Thus, the particles on one side are of sizes in the No. 10 to No. 400 sieve range, preferably 60 to 170 sieve range and on the other side are of particles in the 170 to 400 sieve range, preferably through a No. 200 sieve and sometimes more preferably through a No. 230 sieve.

The most preferred embodiment of the starting neutron absorber of this invention is illustrated and has been described herein and will be that made as described herein but in variations thereof the particles of boron carbide may be adhered to a suitable backing member by means of a preliminary uncured liquid resin coating without the utilization of filler coatings of polymer and of prior coats on the backing member of finely divided boron carbide particles-resin mixes. However, it is preferred to have both sides coated with at least some boron carbide particles in polymeric matrix for several reasons. The boron carbide particles help to increase the strength of the polymer and the ease of application thereof and furnish support for subsequent application(s) of resin, etc. Of course, when utilizing both sides of the backing member a greater total quantity of neutron absorbing $B^{10}$ can be included. Also, with boron carbide particles on both sides of the backing member the backing member material is better protected against radiation effects, at least with respect to neutron emissions. Furthermore, by employing a greater concentration of boron carbide particles on one side than the other, that with the heavier concentration may be located facing the probable source of neutron emissions and thereby may better protect the material of the backing member.

The described starting articles will preferably include the same or closely related polymeric materials in the various layers and mixes and even when such are not employed it will be preferable to utilize polymers with similar curing properties so that a final, preferably complete cure of all the previously only partially cured resins may be effected at the end of the manufacturing procedure.

The starting products are form-retaining, yet possess a sufficient flexibility so that they do not break apart and do not have pieces and boron carbide particles disconnected from them when they are subjected to flexural stresses of moderate degrees. They can be broken apart intentionally but are often resistant to separation, even when bent over 90°, and are resistant to cracking when bent up to 30° or 45°. Also, they are light in weight and are of sufficient tensile strength so that they may be hung or "stood" in place. When free standing, with large sideward movements prevented by enclosing walls, as in a spent fuel storage rack, the product may take a sinuous shape but will still be effective as a satisfactory neutron absorber over the length of the container in which it is positioned. If subjected to stresses sufficient to crack a surface layer of boron carbide particles and polymer, the backing member will normally maintain the integrity of the product and prevent excessive chipping off of pieces thereof. It has been found that even after radiation with as much as $10^{11}$ rads or more the described products, especially if based on a fiberglass backing, often have tensile strengths in excess of 400 kg./sq. cm. Normally the described articles have tensile strengths over 15 kg./sq. cm., preferably over 100 kg./sq. cm. and more preferably over 350 kg./sq. cm. In fact, with phenol formaldehyde type polymers being employed, although the tensile strength of the product diminishes somewhat over lengthy periods of exposure to radiation, up to as much as $10^{11}$ rads, during initial exposure it may even increase slightly, apparently due to the effect of radiation in promoting even more complete cross-linking of the product, beyond the extent readily obtainable with the usual heat cures.

The re-coating or $B^{10}$-increasing methods of this invention may be effected in manners similar to those employed in the coating of the web and subsequent embedding of applied boron carbide particles in it. When using the same types of polymeric materials, having about the same viscosities, similar weights and thicknesses thereof may be applied. For example, when one is obtaining an increase between 50% and 200%, such as from 75% to 150% of the original $B^{10}$ loading (so that the final loading is from 150 to 300%, such as 175 to 250%), the thickness of the final article will usually be in the range of 1.2 to 6 mm., such as from 1.6 to 3.2 mm. The $B^{10}$ loading of the product will usually be from 0.01 to 0.06 g./sq. cm., such as from 0.02 to 0.05 g./sq. cm., and the increase in $B^{10}$ content will usually be at least 25%. In those cases in which double thicknesses of the original absorbing articles are joined together the thicknesses and $B^{10}$ loadings will also be doubled. Correspondingly, the weights of the final articles will be increased accordingly, usually being increased substantially directly in proportion to the increase in $B^{10}$ content.

Although greater loadings than those indicated may be effected, because of the expense of making comparatively thick neutron absorbing articles from a plurality of thin materials and thin coatings (dictated in large part by the viscosity of the liquid coating material) in such cases it will usually be more economical to employ molding processes, such as those described in the first four patent applications referred to earlier. However, the coating operations of this invention are economic for increasing $B^{10}$ contents of manufactured neutron absorbing sheets when more effective neutron absorbers are needed of such type.

The methods of mixing boron carbide particles and resinous materials may be the same as those which have been employed for making such mixtures for creation of the sheet articles to be coated by the method of this invention. Similarly, the applications of resins and resin-boron carbide particle mixes may be the same, as are the depositings and embeddings of coarser boron carbide particles. Although the particle sizes utilized are in the 10 to 400 sieve size range often the boron carbide particles mixed with the resin and those embedded into the surface thereof may be of similar size ranges, such as below 60 mesh, e.g., 60 to 400 mesh. In such cases, the depositings of the particles are such that some will protrude beyond the resin surfaces. Usually at least 10% of the particles will be of sizes greater than 80 sieve and desirably a useful proportion of such particles will project beyond the polymer surface, e.g. a major part.

By having particles protruding from the resin or resin-particle mix surfaces, anchors are provided for subsequent coatings, making the finished neutron absorber of increased capacity of sufficient strength to withstand hazards of use. Similarly, when sheets are joined together by resinous materials or resin-boron carbide mixes, which may sometimes be partially polymerized first, the anchoring boron carbide particles help to hold the sheets together better. Additionally, when such sheets are joined together face to face the protruding particles are covered, making it less likely that any will be removed by mechanical actions during use.

The preferred method of making the composite neutron absorbers being increased in $B^{10}$ content by the method of this invention is described in detail in U.S. Pat. No. 4,218,622. Normally the dimensions of the final articles will be about the same as those described in such case except for the expectedly increased thickness. The length of the comparatively thin sheet or strip will usually be from about 50 to 1,000 times the thickness and the width will be from 25 to 250 times the thickness. Thus, when the product is 2 to 4 mm. thick the length may be about 50 to 200 cm., with the width being about 10 to 30 cm. and with preferred dimensions being about 80 to 100 cm. and 20 to 25 cm., respectively.

In the preferred method for adding on boron carbide to the base articles to increase their $B^{10}$ content the make coat will be of a viscosity of about 700 to 2,000 centipoises at 32° C., preferably 1,000 to 1,500 centipoises and the coating of boron carbide grains on the make coat may be from 50 to 500% of the weight of such coat, preferably 50 to 200% by weight thereof. Partial curing may be effected over a period of about 1 to 5 hours at a temperature of about 95° to 125° C., more preferably over about two hours at a temperature of about 107° C. Final curing may be at a temperature in the range of 95° to 320° C., preferably 95° to 200° C. and more preferably 95° to 125° C., with the curing time being from 2 to 50 hours, preferably from 20 to 40 hours and with the longer curing times being employed for lower temperature cures. The cure will normally be to over 90% of complete cross-linking of the polymer, preferably to over 95% thereof and more preferably 99 to 100%, to the final C-stage.

Although the products of this invention are useful in various applications wherein it is desirable to absorb neutrons from nuclear materials, such as nuclear wastes and nuclear fuels, most preferably they are employed in storage racks for spent nuclear fuel. In any such application it is important that a continuous layer of $B^{10}$ be present so that there is a statistical distribution of boron carbide particles and $B^{10}$ atoms that is uniform and homogeneous so that neutrons emitted from stored nuclear material will pass near enough to $B^{10}$ atoms so as to be "absorbed" by them. It is also important that the $B^{10}$ concentration be capable of being accurately designed into the article and that such is producible commercially so that nuclear power installations may have racks for spent fuel positively protected against releases of neutrons to the environment. By means of the present invention such even distribution of boron carbide particles and $B^{10}$ are obtained so that the absorbers are uniformly effective. This is due in part to the even distribution resulting from application of a $B_4C$ particle screen onto the resin mix coated article surface and to the retention of the particles by the resin after embedding.

The following examples illustrate but do not limit the invention. Unless otherwise mentioned all temperatures are in °C. and all proportions and percentages are by weight.

EXAMPLE 1

The starting sheet of neutron absorbing material to be increased in $B^{10}$ content, of a thickness of about 1.3 mm., a length of 75 cm. and a width of 25 cm., containing about 0.014 g./sq. cm. of $B^{10}$ and 0.107 g./sq. cm. of boron carbide and weighing about 0.174 g./sq. cm., is one that is made by the method of Example 1 of U.S. Pat. No. 4,218,622. The product made is like that of FIG'S. 1 and 2 and is produced using equipment like that shown diagrammatically in FIG. 3. When visually examined the back fill is thin enough so that the shape of the weave of the backing member can be detected. The method of manufacture of such a neutron absorbing article is described below and, as was previously mentioned, such method is adaptable, with relatively minor changes, to the manufacture of the improved product of this invention with increased $B^{10}$ content.

The fiberglass cloth backing member of the type known as 8 harness satin having 57 threads in the warp and 54 in the fill, of a thickness of 0.23 mm. and weighing about 300 g./m., which has been heat cleaned to remove any sizing thereon, such as oils and starches, and which has been treated by an aminosilane treatment to enhance adhesion of phenolic resin to fiberglass, is dipped into an Ashland Chemical Company phenol formaldehyde resin identified as Arotap 358-W-70 and the coated cloth is passed through squeeze rolls to remove any excess resin. The resin viscosity is suitable for dip application but if too high it may be lowered by use of solvent(s) and/or heat (but if heat is used the temperature-time combination will be insufficient to effect curing). The backing employed is one wherein the weave has a 7 by 1 interlacing, in which the filling threads float over 7 warp threads and under 1 warp thread. The resin is dried or partially cured onto the backing member cloth by subjecting them to a temperature of 107° C. for about one hour. The weight of the cloth indicates a pickup of about 17% (on the original cloth weight basis) of resin. The dip coated cloth is then back filled on its weave side with a 50:50 mix of the normally liquid phenolic resin and boron carbide particles which pass through a No. 200 sieve and most of which fail to pass a No. 400 sieve. The mix, made by mixing for about 20 minutes in a Cowles or equivalent high energy mixer, is of 5,000 parts of the resin and 5,000 parts of the fine boron carbide particles, with 100 parts of water added, to result in a product of a viscosity of about 7,000 centipoises at 32° C. The back fill weight, as applied, is about 100% of that of the original cloth and when dried adds 45% (original cloth weight basis) of boron carbide. The back filled cloth is then partially cured, in the way described earlier for the nitial resin application to the cloth.

The back fill mix formula is modified by the addition of resin to produce a 55:45 resin:boron carbide particles mix and a small amount of water is added so as to reduce the viscosity to 1,275 centipoises at 32° C. This mix is then applied to the other side of the previously dipped and back filled backing member so that a total weight of 175% of such material (original cloth weight basis) is applied as a make, which gives an addition of about 75% (same basis) of boron carbide particles. The make coat, while it is still wet, has gravity-fed onto it, from a distributor hopper, boron carbide particles of sizes in the No. 60 to No. 200 sieve range to the extent that such cover the wet resin and excess particles are atop the covering layer. The comparatively coarse boron carbide grain is applied evenly, rolled so that it penetrates the resin-finer particles layer and any excess is removed by turning the cloth from horizontal to vertical and further positions and letting unadhered particles fall off. A total of 225% (same basis) of "coarse" boron carbide grain is applied in this manner.

The product, now with a total of about 345% of boron carbide (same basis) thereon, is then dried and/or partially cured so that it can be handled, which takes about two hours at 107° C. A final clear size coat of resin is then applied (about 50% on a wet basis and about 40–45% on a dry basis) to the "coarse" side and the coated product is then dried and/or partially cured to such a state that it can be rolled and cut into desired lengths. The partially cured material is then cut into pieces approximately 25 cm. by 75 cm. (it is about 1 mm. thick) and the pieces are fully cured by drying under weight (flat aluminum plates plus other articles are used to hold the materials flat) in an oven over a period of 30 hours at a temperature of 107° C. Alternatively, the strips can be finally cured continuously and can be stored in rolls.

The neutron absorbing sheet made, while satisfactory in tensile strength (about 450 kg./sq. cm.) after exposure to $10^{11}$ rads and satisfactorily flexible, is of insufficient neutron absorbing power for various operations, in many of which a minimum loading of 0.2 or 0.3 g./sq. cm. of $B^{10}$ may be specified. Accordingly, by the method of the present invention there is applied to the "rough" surface of such sheet a make mix like that described earlier in this example and while it is still wet there are fed onto the surface of such mix boron carbide particles of sizes in the No. 60 to 400 sieve range (60 to 200 may also be used) to the extent that such cover the wet resin, with excess particles atop the covering layer. The boron carbide particles deposited include at least 10% thereof of a size of 80 mesh or larger and a major proportion of such particles, when subsequently pressed into the make coat, will desirably have portions thereof protruding beyond the make coat surface. After even application of the "coarse" boron carbide grains they are rolled into the make coat by means of a roller, such as shown in FIG. 9, and the neutron absorber sheet is turned first to the vertical position and then upside down to let unadhered particles fall off. The proportions of materials employed in the make coat and in the applied or rolledin particles are the same as those for the making of the neutron absorbing article, previously described herein, as are the curing steps, although the application of a final clear size coat is optional and is usually omitted for intermediate layers.

After application of one coat of boron carbide particles the $B^{10}$ content has been increased to 0.020 g./sq. cm., the boron carbide content has been increased to 0.157 g./sq. cm., the weight is 0.230 g./sq. cm. and the thickness of the product is 1.7 mm. Subsequently, the operation is repeated (coating the newly coated surfaces), without a finish coat of resin being applied to the first coat and without final curing of such first coat (it is taken to B-stage instead by partially curing, as previously described) and the $B^{10}$ content, $B_4C$ content and weight, all in g./sq. cm., are, respectively, 0.030, 0.230 and 0.310, with a thickness of 2.0 mm. For subsequent plural coatings, with a total of three coatings added on to the original article, such concentrations and thicknesses are respectively, 0.038, 0.291 and 0.377, with a thickness of 2.4 mm.; with four coatings, 0.046, 0.347, and 0.441, with a thickness of 2.8 mm.; and with five coatings, 0.054, 0.417 and 0.517, with a thickness of 3.2 mm.

The articles made, of increased neutron absorbing capability, when installed in a storage rack for spent nuclear fuel, are more effective as neutron absorbers than such sheets before treatment by the method of this invention. The coating of boron carbide applied is firmly held to the base sheet (in part due to the anchoring effects of the "coarse" particles) and is capable of withstanding exposure to radiation without objectionable deterioration. In addition to use in storage racks for spent nuclear fuel the present neutron absorbers may also be employed in various other applications in which neutron absorption from nuclear fuels, etc., is desirable. The products made still possess significant flexibility, although, of course, they are not as flexible as the initial absorbing sheet that was coated.

In modifications of the method for applying the make mix and coarse boron carbide particles, an apparatus like that of FIG. 3 may be employed, with dimensions and curvatures being altered so as to avoid cracking the sheet or strip, and continous partial and/or complete curing of the polymer may be effected. Also as previously taught in the specification, some boron carbide may be omitted from the make mix and in some instances the resin portion thereof may be employed alone. Additionally, other radiation absorbers, such as lead particles may be blended with the $B_4C$, and diluents, such as silicon carbide may also be used. Also the method may be adapted to increase the $B^{10}$ contents of neutron absorber plates and neutron absorbers of other shapes.

In another modification of this process, after application of one or more coatings of make mix and boron carbide particles to the "rough" surface of the starting neutron absorber and after partial and/or complete curing thereof a similar coating is made on the "smooth" side so as to obtain a product like that of FIG. 5, which will have $B^{10}$ and boron carbide contents like that of the twice coated product of FIG. 4 and will be of similar weight and thickness. Also, instead of using the apparatus described for coating the neutron absorbing article with make mix (or resin) and coarse $B_4C$ particles the resinous materials may be applied carefully by hand or with hand tools to individual sheets and the boron carbide particles may be sprinkled onto the tacky surface thereof by other means and may be pressed into such surface by plates or other non-roller means to product equivalent articles, all of which are of increased neutron absorbing capability and of satisfactory physical properties for employment as neutron absorbers in the described applications.

The compositions, curing times and temperatures and other process conditions described above will be varied within the ranges previously given so as to produce other effective neutron absorbers of increased activity. Thus, the particle sizes of the coarse particles may be changed, the thicknesses of application of the make mix (and the backing mix) may be altered and the compositions of such mixes may be changed, and improved products of this invention will also be obtained.

EXAMPLE 2

In addition to the single or plural coating operations, coating on one side or both sides of the starting neutron absorber, it is also possible (but not usually as desirable) to increase the concentration of $B^{10}$ in a neutron absorbing article in strip or sheet form by applying make mix (or resin) to the rough surfaces of two such sheets, preferably with coarse particles being deposited thereon, and pressing such sheets together and curing to produce an article like that of FIG. 6. All the conditions previously described will be employed and the product resulting will have a $B^{10}$ concentration of about 0.04 g./sq. cm. when, as preferred, the make mix is used, together with "coarse" $B_4C$ particles therein. Of course, by the method of FIG. 9 (or FIG. 3, when applicable) additional boron carbide may be applied to the smooth surfaces of such product. In all such cases the articles made are satisfactory sheet or strip neutron absorbers.

EXAMPLE 3

Although increasing the neutron absorbing capability of a base absorber material is the prime object of this invention, the dimensions of such articles may also be modified, when desired, to produce products like those of FIG'S. 7 and 8. Thus, starting with two basic neutron absorbers like those mentioned in Example 1 and shown in FIG'S. 1 and 2, placed side-by-side on a flat surface, a make coat, normally thicker than employed in Example 1 but otherwise like it, (1.1 to 2 times such thickness) is applied to the rough surfaces of the adjoining absorbers and boron carbide particles are applied thereto, by the method previously described, after which the product is cured. By such method the $B^{10}$ content of the larger base sheet created is increased readily to about 0.025 g./sq. cm. and of course, subsequent coatings may be applied to the "rough" and "smooth" surfaces to further increase the $B^{10}$ content and the product strength. When desired, a sheet or cloth of fiberglass may be included between two portions of make coat in this and other examples (for increased strength).

In addition to increasing the sizes of neutron absorbing sheets or strips and making them continuous, when desired, such sizes may also be diminished by cutting and application of the make coat and boron carbide particles in the manner described in Example 1. Such application increases the neutron absorbing capability as previously described and additionally helps to strengthen the cut edges and sides of the sheet or strip to help to prevent deterioration on use. The products obtained by the methods of this example are satisfactory neutron absorbers capable of extended use when subjected to radiation.

In the foregoing examples instead of using the phenol formaldehyde resins mentioned other such resins and other thermosetting resins, preferably of satisfactory B-stage properties and also capable of ready application by roller, brush, spray or other suitable means, may be substituted but the phenol formaldehyde type resins are highly preferred for their processing and physical properties and for their end use characteristics and resistances to radiation when incorporated in the described product. Similarly, in some instances thermoplastic materials may be substituted but products made with them are not as satisfactory and processing conditions are often not as readily controllable.

The invention has been described with respect to various illustrative examples and embodiments but is not to be limited to these because it is evident that one of skill in the art, with the present specification before him will be able to utilize substitutes and equivalents without departing from the invention.

What is claimed is:

1. A method for increasing the $B^{10}$ content of a neutron absorbing article which includes neutron absorbing boron carbide particles in a matrix of cured solid polymeric material which comprises coating a surface of such article with a curable liquid synthetic organic polymeric material, applying boron carbide particles to the curable polymeric material so that portions of such particles project beyond the surface of the curable polymeric material, and curing and solidifying the polymer to solid form so that it holds the boron carbide particles in place on the neutron absorbing article, with portions of said particles projecting beyond the surface of the cured polymeric material.

2. A method according to claim 1 wherein the neutron absorbing article being increased in $B^{10}$ content is an article comprising a backing member and a cured synthetic organic polymeric coating or two such coatings on major surfaces of said backing member, in at least one of which boron carbide particles are present.

3. A method according to claim 2 wherein the neutron absorbing article being coated is thin, substantially flat and flexible, includes boron carbide particles and cured phenolic polymer on a backing member, the coating of curable polymer is applied to a major surface of the neutron absorbing article in which boron carbide particles are present, and the boron carbide particles projecting beyond the surface of the cured polymeric material coating applied to the neutron absorbing article being increased in $B^{10}$ content are of particle sizes within the No. 10 to 400, U.S. Sieve series, range, with at least 10% of such particles being of particle size greater than No. 80, U.S. Sieve series.

4. A method according to claim 3 wherein the backing member, synthetic organic polymer and neutron absorber of the article being increased in $B^{10}$ content are fiberglass, phenol formaldehyde polymer and boron carbide particles, respectively, the liquid curable synthetic organic phenolic polymer employed to coat the neutron absorbing article is a phenol formaldehyde polymer and the amount of boron carbide particles applied to increase the $B^{10}$ content of the neutron absorbing article increases such content at least 25%.

5. A method according to claim 1 wherein a thin, substantially flat neutron absorbing article of size larger than that desired, in at least one direction other than thickness, is trimmed to size and subsequently is coated with the curable liquid phenol formaldehyde type polymer and boron carbide particles projecting beyond the polymer surface, so that at least some of the curable polymer is applied near the trimmed edges of the article, and the polymer is solidified to cross-linked, permanently set form, to protect such edges against deterioration.

6. A method according to claim 1 wherein the boron carbide particles are deposited onto the curable liquid polymer surface of the coating on the neutron absorbing article and are pressed into such coating in such manner that they become embedded therein, with parts of at least some of the boron carbide particles projecting from said coating and without having pressing means contact the coating, and excess boron carbide particles are removed before curing of the polymer.

7. A method according to claim 1 wherein plural applications of curable polymer and boron carbide particles are made to the article to be increased in $B^{10}$ content with partial curings of the applied polymer between such applications, and the applied polymers, with boron carbide particles held thereto, are solidified to cross-linked, permanently set form in a curing operation.

8. A method according to claim 1 wherein a plurality of flat neutron absorbing articles is supported adjacent each other in substantially the same plane and surfaces of such articles at substantially the same level are coated with a curable and solidifiable liquid synthetic organic polymeric material, after which boron carbide particles are applied to the curable polymeric material and such material is solidified to permanently set form so as to hold the boron carbide particles in place on the neutron absorbing articles and bind such articles together into a larger neutron absorbing article.

9. A method according to claim 1 wherein the curable liquid synthetic organic polymeric material employed to coat the surface of the article to be increased in $B^{10}$ content is applied thereto as a mixture of such curable polymer and boron carbide particles, to which boron carbide particles are subsequently applied so that portions thereof project beyond the surface of the curable polymeric material.

* * * * *